(12) United States Patent
VanBlon et al.

(10) Patent No.: US 12,095,579 B2
(45) Date of Patent: Sep. 17, 2024

(54) RECORDING OF ELECTRONIC CONFERENCE FOR NON-ATTENDING INVITEE

(71) Applicant: Lenovo (Singapore) Pte. Ltd., Singapore (SG)

(72) Inventors: Russell Speight VanBlon, Raleigh, NC (US); Arnold Weksler, Morrisville, NC (US); John C. Mese, Cary, NC (US); Mark Delaney, Raleigh, NC (US); Nathan Peterson, Oxford, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 192 days.

(21) Appl. No.: 17/845,627

(22) Filed: Jun. 21, 2022

(65) Prior Publication Data

US 2023/0412411 A1    Dec. 21, 2023

(51) Int. Cl.
*H04L 12/18*   (2006.01)
*G06F 3/0482*   (2013.01)
*H04N 7/15*   (2006.01)

(52) U.S. Cl.
CPC ........ *H04L 12/1822* (2013.01); *G06F 3/0482* (2013.01); *H04L 12/1818* (2013.01); *H04N 7/152* (2013.01); *H04N 7/155* (2013.01)

(58) Field of Classification Search
CPC ............ H04L 12/1822; H04L 12/1818; H04L 12/1831; G06F 3/0482; H04N 7/152; H04N 7/155; G06Q 10/1095; H04M 3/42221; H04M 2203/5081
See application file for complete search history.

(56) References Cited

U.S. PATENT DOCUMENTS

2011/0107236 A1* 5/2011 Sambhar ............... H04M 3/563
                                                             715/753
2019/0327362 A1* 10/2019 Herrin ..................... G10L 15/26

* cited by examiner

*Primary Examiner* — Yogeshkumar Patel
(74) *Attorney, Agent, or Firm* — John M. Rogitz; John L. Rogitz

(57) ABSTRACT

In one aspect, at least one device includes at least one processor and storage accessible to the at least one processor. The storage includes instructions executable by the at least one processor to determine that at least part of a video conference (or even an audio conference) is to be recorded for a non-attending invitee of the video conference. Responsive to the determination, the instructions are executable to prompt an attendee of the video conference to record at least part of the video conference and/or record at least part of the video conference.

20 Claims, 6 Drawing Sheets

Record For:

Keywords/ Topics: [_____] ~502

☐ If Name Is Mentioned ~504

Agenda (Select For Recording A Given Segment): ~506

☐ Introduction/ Ice Breakers ~508
☐ Part 1 - Project Review
☐ Part 2 - Future Goals
☐ Conclusion

[ Submit ] ~510

FIG. 5

Note:

Steve Is On The Conference, And It Looks Like He Has Been Mentioned And Are Starting To Talk About His Part Of The Project ("App Programming") ~602

Record This Segment?  [Y] 604  [N] 606
608~ [All]

FIG. 6

RECORDING OF ELECTRONIC CONFERENCE FOR NON-ATTENDING INVITEE

FIELD

The disclosure below relates to technically inventive, non-routine solutions that are necessarily rooted in computer technology and that produce concrete technical improvements. In particular, the disclosure below relates to recording an electronic conference for a non-attending invitee of the video conference.

BACKGROUND

As recognized herein, video conferences present a unique set of issues that do not necessarily arise with in-person conferences. As further recognized herein, among these issues is that often a user is expected to participate in multiple video conferences transpiring at the same time, but if this occurs then the user might miss part of either or both video conferences. As also recognized herein, setting the system to always record every video conference is not a manageable solution as this consumes an undue amount of processor resources to process all of the recordings while also consuming as an undue amount of electronic storage space to store all the recordings. Accordingly, there are currently no adequate solutions to the foregoing computer-related, technological problem.

SUMMARY

Accordingly, in one aspect at least one device includes at least one processor and storage accessible to the at least one processor. The storage includes instructions executable by the at least one processor to determine that an invitee to a video conference is not attending the video conference. Responsive to the determination, the instructions are executable to record at least part of the video conference and/or prompt an attendee of the video conference to record at least part of the video conference.

In some example embodiments, the instructions may be executable to determine that the invitee to the video conference is not attending the video conference and determine that the invitee requested that at least part of the video conference be recorded based on the invitee not attending the video conference. Responsive to the determinations, the instructions may then be executable to record at least part of the video conference and/or prompt the attendee of the video conference to record at least part of the video conference. So, for example, data indicating that the invitee requested that at least part of the video conference be recorded may be received as part of a response to a meeting invitation sent to the invitee. Thus, in certain specific examples, the instructions may be executable to present on a display a graphical user interface (GUI) that presents the meeting invitation. The GUI may include a selector that is selectable for the invitee to generate the data, where the data may be used for the determination that the invitee requested that at least part of the video conference be recorded based on the invitee not attending the video conference.

Also in some example embodiments, the instructions may be executable to determine that the invitee to the video conference is not attending the video conference and determine that an organizer of the video conference has indicated that, based on the invitee not attending the video conference, at least part of the video conference be recorded. The organizer may be different from the attendee. Responsive to the determinations, the instructions may then be executable to record at least part of the video conference and/or prompt the attendee of the video conference to record at least part of the video conference. So, for example, the organizer may provide the indication through a graphical user interface (GUI) used to schedule the video conference.

Additionally, note that in some example implementations the instructions may be executable to determine that the invitee to the video conference is not attending the video conference and determine that one or more keywords have been spoken by someone actually attending the video conference. In these implementations, the instructions may be executable to, responsive to the determinations, record at least part of the video conference and/or prompt the attendee of the video conference to record at least part of the video conference. The one or more keywords themselves may include a name of the invitee, and/or may indicate that attendees of the video conference are to begin discussing a topic associated with the video conference.

In another aspect, a method includes determining that a non-attending invitee to a conference has requested that at least part of the conference be recorded. The method also includes, responsive to the determining, recording at least part of the conference and/or prompting an attendee of the conference to record at least part of the conference.

Thus, in some examples the method may include determining that the non-attending invitee to the conference has requested that a particular segment of the conference be recorded. The method may then include, based on determining that the conference has reached the particular segment, recording the particular segment of the conference but not all of the conference and/or prompting the attendee of the conference to record at least the particular segment of the conference. So, for example, the method may include determining that the conference has reached the particular segment based on speech of one or more attendees of the conference and, based on determining that the conference has reached the particular segment based on the speech of one or more attendees of the conference, recording the particular segment of the conference but not all of the conference and/or prompting the attendee of the conference to record at least the particular segment of the conference. In one specific example implementation, the method might even include maintaining a buffer of content for a most-recent threshold amount of the conference and, based on determining that the conference has reached the particular segment based on the speech of one or more attendees of the conference, recording the particular segment of the conference to include at least part of the buffered content and/or prompting the attendee of the conference to record the particular segment of the conference including at least part of the buffered content.

In still another aspect, at least one computer readable storage medium (CRSM) that is not a transitory signal includes instructions executable by at least one processor to determine that at least part of a conference is to be recorded for a non-attending invitee of the conference. The instructions are also executable to, responsive to the determination, record at least part of the conference and/or prompt an attendee of the conference to record at least part of the conference.

Thus, in some examples the instructions may be executable to determine that the non-attending invitee requested that at least part of the conference be recorded and, responsive to the determinations, record at least part of the conference and/or prompt the attendee of the conference to record at least part of the conference.

Also in certain examples, the instructions may be executable to determine that an organizer of the conference has requested that at least part of the conference be recorded based on the non-attending invitee not attending the conference, where the organizer may be different from the non-attending invitee. In these examples, the instructions may be executable to, responsive to the determinations, record at least part of the conference and/or prompt the attendee of the conference to record at least part of the conference.

Still further, if desired in certain example embodiments the instructions may be executable to determine that the non-attending invitee has requested that a particular segment of the conference be recorded and, based on the determination that the conference has reached the particular segment, record the particular segment of the conference but not all of the conference and/or prompt the attendee of the conference to record at least the particular segment of the conference. So, for example, the instructions may be executable to determine that the conference has reached the particular segment based on data in an electronic agenda for the conference and based on execution of speech recognition software.

The details of present principles, both as to their structure and operation, can best be understood in reference to the accompanying drawings, in which like reference numerals refer to like parts, and in which:

BRIEF DESCRIPTION OF THE DRAWINGS

FIG. 5 shows an example GUI that may be presented to specify one or more parameters for recording some or all of the video conference consistent with present principles;

FIG. 6 shows an example prompt/GUI that may be presented to a conference attendee to record some or all of a video conference consistent with present principles;

DETAILED DESCRIPTION

Figure 1:
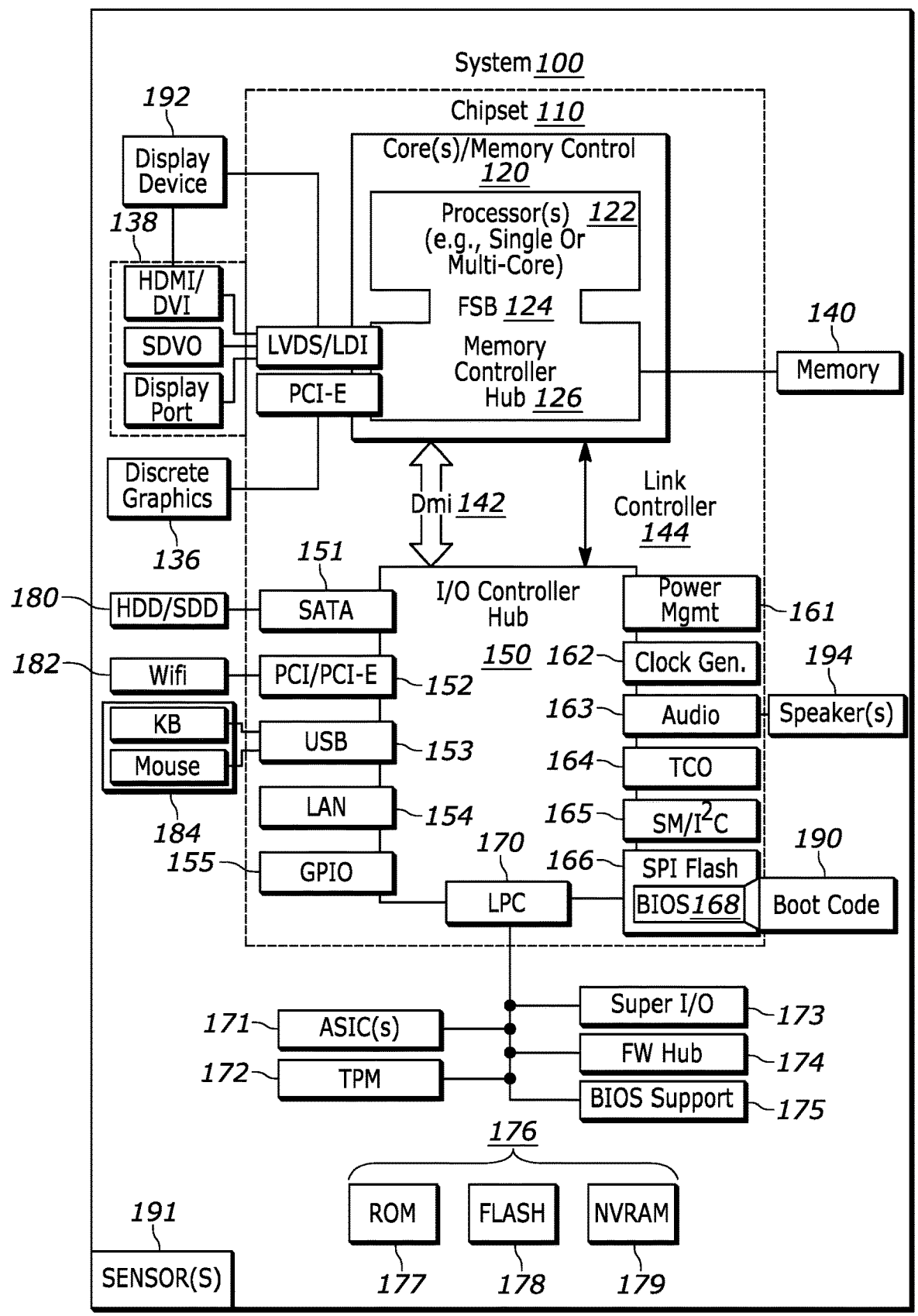
FIG. 1 is a block diagram of an example system consistent with present principles.

Among other things, the detailed description below discusses generating an audio/video (AV) recording (or audio recording) of some or all of a video conference or another type of conference, such as an audio-only conference like a telephone call. For instance, each meeting participant/invitee can identify virtual meetings that they deem important and, in advance, tag such meetings for recording if they cannot attend in person or virtually. The tag may be used to auto-record the meeting, and/or first notify another participant to record the meeting at the start of the meeting or at another time during the meeting.

So, for example, when the online meeting starts and audible dialog begins between the attendees (and/or certain keywords are spoken like "Let's get started"), actual attendees that are present in the meeting may receive a notification with a list of absent invitees who have requested recording if those people are not present. Thus, in some examples the notification may be suppressed/not presented if all such participants were actually in attendance for the meeting.

Furthermore, meeting participants may also tag a portion of a meeting agenda for recording of that specific portion (e.g., to minimize storage/resources used for recording the online meetings). Accordingly, a programmatic agenda may be provided by someone to delineate potential recordings per agenda topic. If no agenda is available for a given online meeting, or even if one is available, participants may also specify topics and/or keywords so that conversations around those subjects/keywords/topics (plus or minus a certain buffer/amount of time, for example) may be recorded.

Thus, as an example, an invitee to an online meeting may respond to a meeting invitation with a "tentative and record in my absence" designation or other similar flag (e.g., accept, decline, etc.) to indicate their preference to have the meeting recorded if that person cannot attend (or has to leave the online meeting early). Thus, if a flagged participant is not able to attend, the unified communications/video conferencing software may notify another user to record and/or itself autonomously record the online meeting.

Furthermore, in some examples the organizer or another attendee may indicate to the system that "optional" invitees may be treated differently from "required" invitees. Thus, responsive to a "required" invitee not actually attending, a recording may be generated for that person. But, also in certain example implementations, a recording might also be generated for "optional" invitees only responsive to a threshold, plural number of "optional" invitees being determined as not attending (e.g., to also minimize storage/resources used for recording the online meetings). The threshold number of "optional" invitees may be established by an end-user such as the meeting organizer or another invitee using a settings GUI, for example. Thus, if only one "required" invitee is not attending, a recording may be generated, whereas if only one "optional" invitee is not attending then a recording may not be generated.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, solid state drive, CD ROM, or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface. Example network connections include Wi-Fi as well as wide-area networks (WANs) such as 4G and 5G cellular networks.

The interfaces of the I/O hub controller 150 may provide for communication with various devices, networks, etc. For example, where used, the SATA interface 151 provides for reading, writing, or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include one or more sensors 191 that may be used for video conferencing as described herein (as well as other purposes). For example, the sensors 191 may include an audio receiver/microphone that provides input from the microphone to the processor 122 based on audio that is detected, such as via a user providing audible input to the microphone to speak as part of a video conference for the audio to then be streamed in real time to other devices as part of a video conference. The sensors 191 may also include a camera that gathers one or more images and provides the images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather still images and/or video of a user's face to stream in real time to other devices as part of a video conference.

Additionally, though not shown for simplicity, in some embodiments the system 100 may include a gyroscope that senses and/or measures the orientation of the system 100 and provides related input to the processor 122, an accelerometer that senses acceleration and/or movement of the system 100 and provides related input to the processor 122, and/or a magnetometer that senses and/or measures directional movement of the system 100 and provides related input to the processor 122. Also, the system 100 may include a global positioning system (GPS) transceiver that is configured to communicate with satellites to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
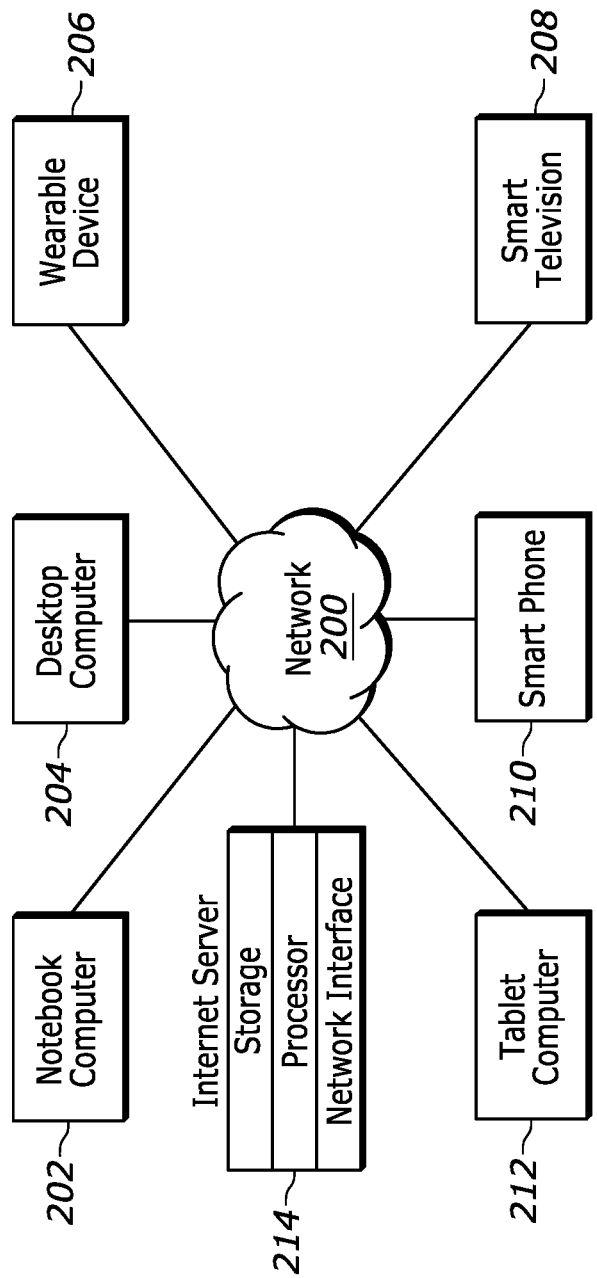
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the client devices 202-212. It is to be understood that the devices 202-214 may be configured to communicate with each other over the network 200 to undertake present principles (e.g., for the client devices 202-212 to exchange audio/video (AV) feeds of their respective users as part of a video conference, possibly as routed through the server 214).

Figure 3:
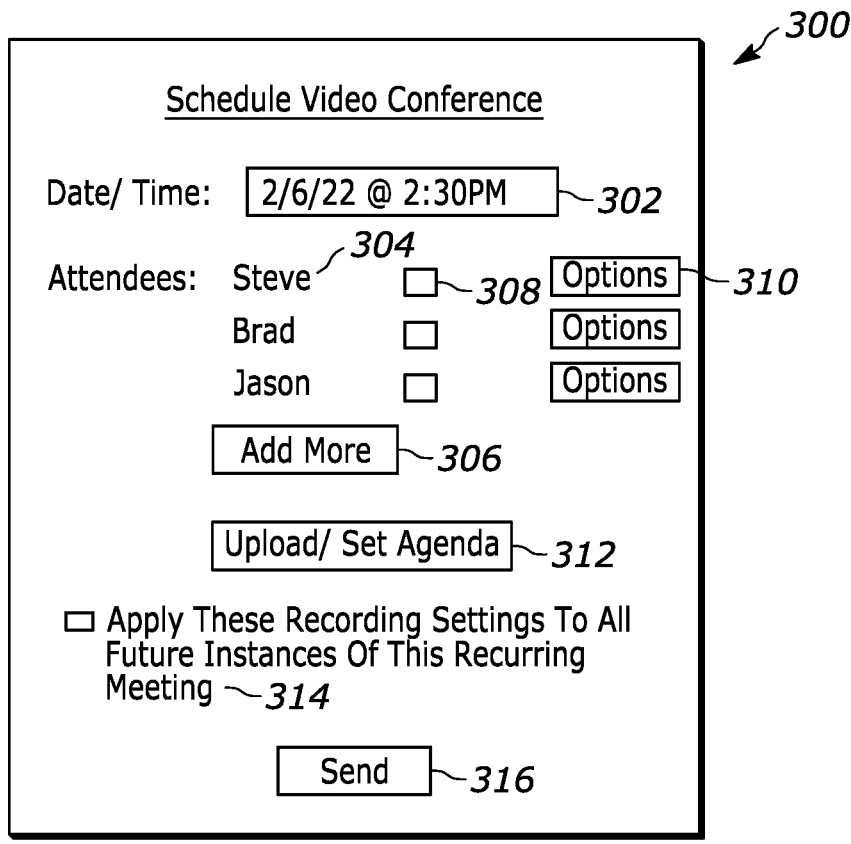
FIG. 3 illustrates an example graphical user interface (GUI) that may be used by a conference organizer to schedule a video conference consistent with present principles.

Turning now to FIG. 3, suppose as an example that a team leader or supervisor wishes to organize a video conference for work. The organizer may launch a video conferencing application ("app") or other unified communication (UC) software to schedule the video conference and send electronic invitations to other people that the organizer wants to invite. FIG. 3 thus shows an example graphical user interface (GUI) 300 that the organizer may use to schedule the video conference.

As shown, the GUI 300 may include one or more fields 302 at which a date and time for the video conference may be specified. If desired, the one or more fields 302 may also include a field where a location of the conference may be indicated, should one or more invitees wish to attend in person (such as in a conference room at their employer's building that has a camera and microphone for streaming their faces and voices to virtual attendees located elsewhere as part of the video conference).

As also shown in FIG. 3, the GUI 300 may include a list 304 of attendees that the organizer has already added as invitees to the video conference, with more invitees being addable by selecting the "add more" selector 306 for the organizer to select additional invitees from a list (or other GUI element) that may be presented as a pop-up over the GUI 300. Then for each added invitee, a respective check box or other type of selector 308 may accompany the indication of that invitee's name. Each selector 308 may be selectable to set the video conferencing system to, if the respective invitee is determined to not be present for the video conference itself, one or more of prompt an attendee (e.g., the organizer themselves) during the video conference to record the video conference and/or autonomously record the video conference for the respective invitee.

If desired, a respective "options" selector 310 may also be presented for each invitee that is added, with each respective selector 310 being selectable to provide additional parameters for video conference recording for that respective invitee. An example GUI that might be presented in response to selection of one of the selectors 310 will be discussed later in reference to FIG. 5.

However, still in reference to FIG. 3, note more generally that the video conferencing system may determine whether a given invitee is actually present for the video conference a number of different ways. For example, for in-person attendees that attend the video conference at a designated conference location (e.g., the conference room mentioned above), various types of biometric identification may be used. E.g., input from sensors such as cameras and microphones at the designated conference location may be used for facial and voice/speaker recognition, respectively, to identify a given attendee. Additionally or alternatively, wireless signals detected at a conferencing hub device at the designated location may be used, where the wireless signals indicate identifying information for a user associated with a nearby client device that transmitted the signals. The signals might be Wi-Fi or Bluetooth signals, for example. For virtual attendees that log on to the video conference remotely rather than attending at the designated conference location, their identities may be known/determined based on login information for a given attendee's account as used to login to the conference. The identity of virtual attendees may also be known/determined based on a known phone number already associated with the remote attendee that the remote attendee then uses to call in to the conference.

Still in reference to FIG. 3, as also shown the GUI 300 may further include a selector 312 that may be selectable for the organizer to set or upload an electronic agenda for the video conference that may then be stored electronically for purposes to be described in more detail below. As further shown in FIG. 3, the GUI 300 may include an option 314 that may be selectable via the corresponding check box to apply the recording settings designated by the organizer not just to the current video conference that is being organized but to all future video conferences of the same type (e.g., involving the same attendee or combination of attendees, and/or if the meeting is a recurring meeting that happens on a regular basis).

Then after the organizer has set the conference parameters as desired, the organizer may select the send selector 316 to both schedule the conference in the video conferencing system and command the video conferencing system to send invitations to the invitees designated by the organizer (e.g., via email or a notification through the video conference's app).

Figure 4:
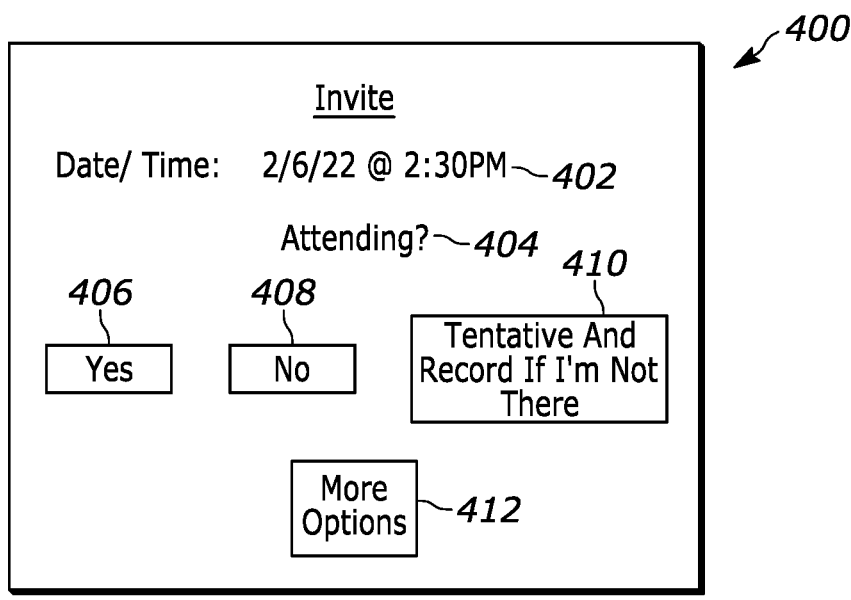
FIG. 4 illustrates an example GUI that may be presented as an invitation to a video conference consistent with present principles.

FIG. 4 thus shows an example GUI 400 that may be presented on the display of an invitee's client device to present an invitation to the video conference. As shown, the GUI 400 may include an indication 402 of a date and time for the meeting and, if applicable, a designated conference location for people to attend the video conference in person if they so choose.

The GUI 400 may also include a prompt 404 asking whether the invitee will attend the video conference. A "yes" selector 406 may be selectable to respond in the affirmative, while a "no" selector 408 may be selectable to respond in the negative.

Consistent with present principles, the GUI 400 may also include a selector 410 that may be selectable for the respective invitee to both respond that they will tentatively attend the meeting and command the system to record all or part of the video conference should that invitee not actually attend.

However, note also that in some example implementations, a pop-up overlay may be presented over the GUI 400 responsive to one of the selectors 406, 408 being selected. This overlay/GUI may also include a prompt asking whether the invitee that indicated they will attend the video conference (option 406) or will not attend the video conference (option 408) would still like all or part of the video conference recorded anyway.

In any case, however the command has been provided to record some or all of the conference, the invitee might also select the "more options" selector 412. The selector 412 may be selectable to command the user's device and/or conferencing system to then present another GUI for specifying certain recording parameters. For example, selection of the selector 412 may command the user's device to present the GUI 500 of FIG. 5.

However, before describing FIG. 5 in detail, note again that depending on implementation the GUI 500 may be presented on the display of the video conference organizer's device as set forth above for specifying video recording parameters for a given attendee (themselves or another person they invite), and/or may be presented on the display of an invitee's device as also set forth above for specifying video recording parameters for the respective invitee themselves.

Now describing FIG. 5, the GUI 500 may be used to set various types of parameters that may trigger video recording of some or all of a given video conference for a respective invitee/organizer. So, for example, the user may enter input to input box 502 (e.g., using a hard or soft keyboard) to provide one or more keywords or topics that the conferencing system should recognize and use as a trigger to begin recording a segment of the conference (or to record all of the conference if a buffer of all of the conference is being maintained in RAM or elsewhere).

To this end, note that keyword recognition and speech recognition software (such as natural language processing (NLP) and topic segmentation in particular) may be used to parse audio of the video conference itself in real time as the conference transpires to recognize user-designated keywords and/or topics of discussion for which an AV recording of the video conference should be generated and stored. In some examples, the conferencing system may even maintain a rolling buffer of content for a most-recent threshold amount of the video conference (e.g., a most-recent thirty seconds, with expiring portions of the buffer beyond the most-recent 30 seconds being discarded) so that if the user-designated keyword is not spoken immediately at the beginning of a discussion the entire duration of which should be recorded, or if the user-designated topic is not immediately recognized by the system until greater context is gained from a few statements about the topic, the system may add part of the buffer to the recording from a point at which the system determines that segment of the conference actually began. The point at which the segment itself actually began may be identified from recognized transitional phrases or even topic segmentation once the keyword/topic itself has been recognized, for example. Thus, based on the video conference reaching a particular segment that should be recorded as determined based on the identified speech of one or more attendees of the video conference, in various examples the system may begin recording that particular segment while also including at least part of the buffered content (and/or may prompt an attendee first to record, with attendee authorization then causing the system to generate the recording possibly with some of the rolling buffer added to it).

As also shown in FIG. 5, the GUI 500 may include an option that may be selectable to command the system to record a given segment (or all) of the video conference responsive to identifying the respective invitee's name as being audibly spoken by an attendee as part of the segment/conference (the name thus also constituting a keyword in certain examples).

The GUI 500 may also include a section 506 with various options 508 that are respectively selectable to select respective segments of the conference that should be individually recorded for the respective invitee, or that may be recorded and merged into a signal file/recording for the respective invitee to observe at a later time. Each option 508 that is presented for a given video conference may be determined from an electronic agenda uploaded or provided by the organizer themselves (or another attendee), such as based on selection of the selector 312 from FIG. 3 as set forth above. Thus, the invitee may be able to specify specific segments, but possibly not all, of the video conference that should be recorded for the invitee to observe the recording at a later time. The beginning of the segments themselves may be identified by the system, for example, based on a scheduled start time for those segments as indicated in the electronic agenda, and/or using speech recognition software such as NLP/topic segmentation in particular to correlate audible speech to a particular segment as indicated in the electronic agenda.

Then once the invitee has provided their desired input and/or made their desired selections from the GUI 500, the submit selector 510 may be selected to submit the invitee's selections to the conferencing system for the system to take action accordingly.

Continuing the detailed description in reference to FIG. 6, an example GUI 600 is shown that may be presented on the display of a client device of one or more attendees of the video conference during the video conference itself (e.g., on the organizer's client device) in certain example implementations where an actual attendee is prompted to record all or part of the conference for a non-attending invitee before the system actually records. The GUI 600 may therefore include a prompt 602 that may be dynamically generated based on the parameters set for the given non-attending invitee. In the example shown, the prompt 602 indicates that an invitee named Steve is "on the conference" (invited), and that the system has determined that his name has been mentioned and that the attendees are starting to discuss a topic associated with his portion of a work project per a keyword/topic of "app programming" that has been specified as a trigger for video recording.

The prompt 602 may therefore also ask whether the attendee wishes to record this segment of the video conference. The attendee may then select the "yes" selector 604 to command the system to record this segment, as well as a "no" selector 606 to command the system to decline to record this segment. Or if desired, the attendee may select the selector 608 to command the system to not just record the relevant segment of the video conference but to record and store all of the video conference for the non-attending invitee.

Figure 7:
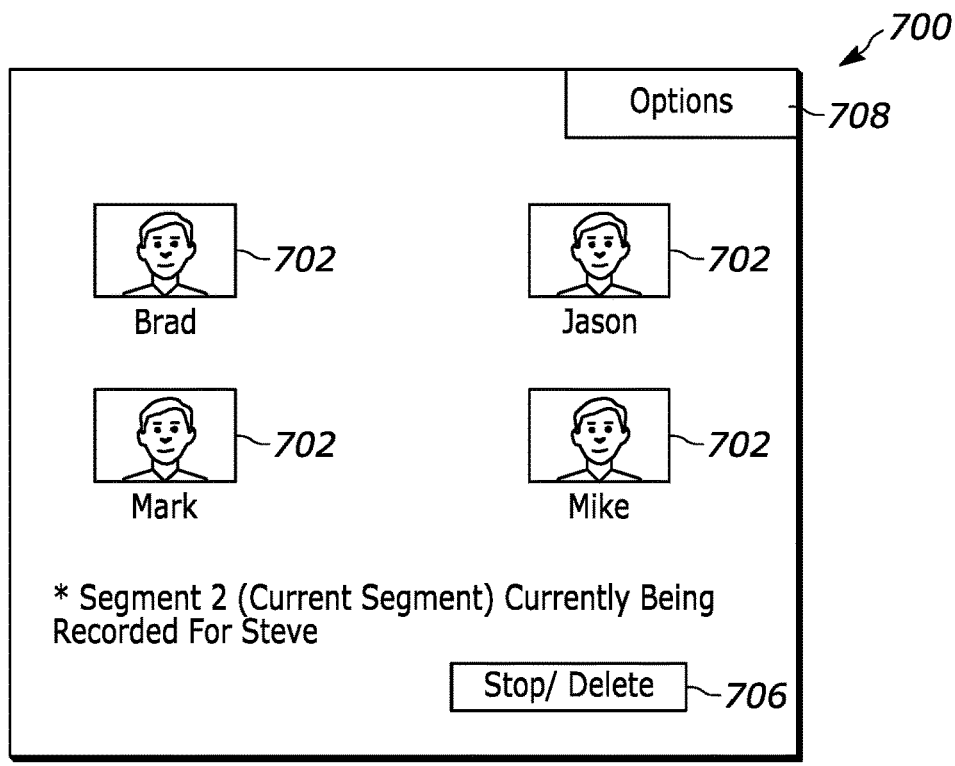
FIG. 7 shows an example GUI that may be presented during a video conference to indicate that some or all of the video conference is being recorded consistent with present principles.

FIG. 7 then shows another example where the system autonomously begins recording all or a given segment of the video conference based on identifying one or more triggers/parameters such as those discussed above, and/or where the system has been commanded to record the video conference such as based on selection of one of the selectors 604, 608 described above. As shown, respective real-time video feeds 702 of actual attendees of the video conference are presented as part of the GUI 700.

The GUI 700 may also include an indication 704 that a particular, current segment of the video conference is being recorded for the non-attending invitee Steve (generally designated "Segment 2" in this example but that may be designated by whatever title the organizer has given to the segment per the uploaded agenda). However, if for some reason the attendee to which the GUI 700 is presented (e.g., the organizer) does not wish for this segment to be recorded, the stop/delete selector 706 may be selected to either simply stop recording, or stop recording and also delete any portion of that segment that has already been recorded by the system. Also if desired, the attendee may select the options selector 708 to add, remove, or modify various parameters that have been set for video recording for the non-attending invitee (Steve), which in turn may cause the GUI 500 of FIG. 5 to be presented for such modifications, for example.

Figure 8:
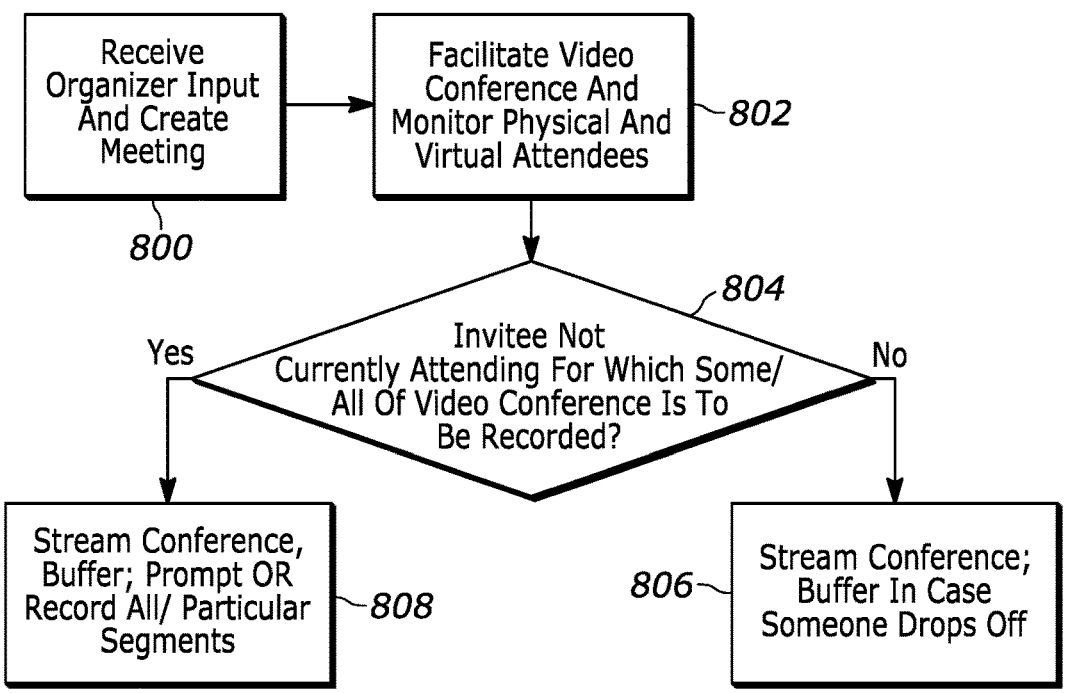
FIG. 8 shows example logic in example flow chart format that may be executed by a device consistent with present principles.

Referring now to FIG. 8, example logic consistent with present principles is shown that may be executed in any appropriate combination by one or more devices such as the system 100, a client device participating in a video conference, and/or a remotely-located coordinating server operating a video conferencing system. Note that while the logic of FIG. 8 is shown in flow chart format, other suitable logic may also be used. Also note here that while the video conferencing system may be hosted/executed at the coordinating server itself, in some examples it may also be executed at one of the client devices if desired (e.g., in peer-to-peer networking environments where the AV feeds from each attendee's client device are not routed through the server to other attendees).

In any case, beginning at block 800, the device may receive input from an organizer to schedule a video conference and then send invites to the respective attendees. For example, at block 800 the device may receive input to the GUI 300 of FIG. 3 discussed above. From block 800 the logic may then proceed to block 802.

At block 802 the device may facilitate a video conference by transmitting A/V content and metadata between conferencing devices, such as a client device transmitting its local camera and microphone streams to others in real time and also receiving camera and microphone streams from other client devices of other attendees for local real time presentation. Or at block 802, the coordinating server may route the A/V communications between the client devices and control one or more conferencing-related GUIs presented locally at the client devices of the respective attendees.

Also at block 802, the device may monitor physical/in-person attendees for the video conference that may be located in a designated conference location as set forth above, as well as monitor for virtual attendees that have logged in/called in to the video conference as also set forth above. From block 802 the logic may then proceed to decision diamond 804.

At diamond 804 the device may determine, based on the monitoring, whether an invitee to the video conference for which some or all of the conference is to be recorded is actually/currently attending the video conference. A negative determination at diamond 804 (e.g., that no such invitee is missing from the conference, or that all invitees are attending) may cause the logic to proceed to block 806. At block 806 the device may stream the video conference to each attendee, and in some example may also buffer some or all of the conference in case an invitee that attends the conference joins late, misses a portion, or disconnects from the conference prior to its conclusion (in which case some or all of the conference may be recorded for that attendee based on recording parameters already set for that attendee as discussed above).

However, responsive to an affirmative determination at diamond 804 (e.g., an invitee for which some or all of the conference should be recorded is not attending), the logic may instead proceed from diamond 804 to block 808. At block 808 the device may stream the video conference to each attendee while buffering some or all of the conference to then record some or all of the conference for the invitee. So, for example, at block 808 the device may begin autonomously recording all or a particular segment of the conference based on recording parameters set for the respective invitee as set forth above, or if desired the device may prompt an actual attendee of the video conference first to then record some or all of the conference responsive to input from the attendee to do so.

Then, also at block 808 and either during the video conference or thereafter, the device may make the recording available for download or streaming by the non-attending invitee(s). The file for the recording may therefore be stored at a remote storage location, such as at the coordinating video conferencing server itself or the non-attending invitee's own personal cloud storage. Additionally or alternatively, the recording file may also be emailed to the non-attending invitee at the invitee's email address, and/or may be autonomously downloaded to local storage on the invitee's own client device without a specific command from the non-attending invitee to do so.

Figure 9:
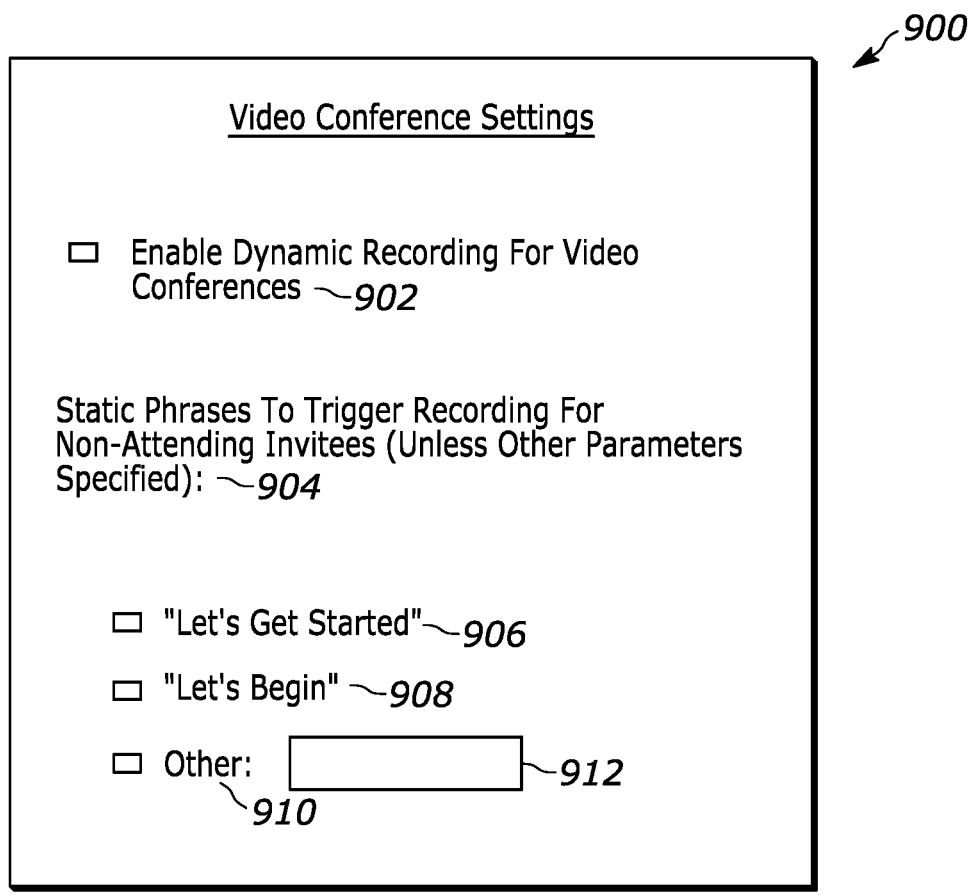
FIG. 9 shows an example settings GUI that may be presented on a display to configure one or more settings of a device/video conferencing system to operate consistent with present principles.

Continuing the detailed description in reference to FIG. 9, it shows an example GUI 900 that may be presented on the display of an organizer's or other attendee's client device to configure/enable one or more settings related to video conferencing consistent with present principles. The settings GUI 900 may be reached by navigating a settings menu of the device or a dedicated app menu for a given video conferencing service, for example. Also note that in the example shown, each option discussed below may be selected by directing touch or cursor input to the respective check box adjacent to the respective option (with it being further noted that other selectors/options discussed for the other GUIs above may be similarly selected using touch, cursor, or other input for example).

As shown in FIG. 9, the GUI 900 may include an option 902 that may be selectable a single time to set or configure the device/conferencing system to enable dynamic recording for video conferences as set forth herein. For example, selection of the option 902 may configure the device to execute the logic of FIG. 8 as well as to execute the other actions described above in reference to FIGS. 3-7 in multiple future instances/video conferences over time.

If desired, the GUI 900 may also include a setting 904 at which one or more static phrases/keywords may be selected, the audible utterance of which by an attendee during a given video conference may trigger recording of some or all of the video conference for non-attending invitees (e.g., in addition to or in lieu of other parameters that might be configured for a given invitee or video conference). Thus, the setting 904 may be accompanied by respective options 906, 908.

As reflected in FIG. 9, the option 906 may be selectable to select the transitional phrase "Let's get started" as one such phrase. Option 908 may be selectable to select the transitional phrase "Let's begin" as another such phrase. Additionally, in some examples the end-user may specify their own static phrase for which to monitor for triggering recording by selecting the option 910 and then providing text input to input box 912 to establish a customized phrase.

It may now be appreciated that present principles provide for an improved computer-based user interface that increases the functionality and ease of use of the devices disclosed herein while also improving the optimization of processor resources and electronic storage space for video conference recordings. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged, or excluded from other embodiments.

What is claimed is:

1. At least one device, comprising:
   at least one processor; and
   storage accessible to the at least one processor and comprising instructions executable by the at least one processor to:
   determine that an invitee to a video conference is not attending the video conference;
   based on the invitee being a required attendee for the video conference, record at least part of the video conference based on the determination that the invitee is not attending the video conference; and based on the invitee being an optional attendee for the video conference, decline to record at least part of the video conference.

2. The device of claim 1, wherein the instructions are executable to:

determine that the invitee to the video conference is not attending the video conference and determine that the invitee requested that at least part of the video conference be recorded based on the invitee not attending the video conference; and responsive to the determinations, one or more of: record at least part of the video conference, prompt an attendee of the video conference to record at least part of the video conference.

3. The device of claim 2, wherein data indicating that the invitee requested that at least part of the video conference be recorded is received as part of a response to a meeting invitation sent to the invitee.

4. The device of claim 3, wherein the instructions are executable to:

present, on a display, a graphical user interface (GUI) presenting the meeting invitation, the GUI comprising a selector that is selectable for the invitee to generate the data, the data used for the determination that the invitee requested that at least part of the video conference be recorded based on the invitee not attending the video conference.

5. The device of claim 1, wherein the instructions are executable to:

determine that the invitee to the video conference is not attending the video conference and determine that a human organizer of the video conference has indicated that, based on the invitee not attending the video conference, at least part of the video conference be recorded, the human organizer being different from the attendee; and responsive to the determinations, one or more of: record at least part of the video conference, prompt the attendee of the video conference to record at least part of the video conference.

6. The device of claim 5, wherein the human organizer provides the indication through a graphical user interface (GUI) used to schedule the video conference.

7. The device of claim 1, wherein the instructions are executable to:

determine that the invitee to the video conference is not attending the video conference and determine that one or more keywords have been spoken by someone actually attending the video conference; and responsive to the determinations, one or more of: record at least part of the video conference, prompt the attendee of the video conference to record at least part of the video conference.

8. The device of claim 7, wherein the one or more keywords comprise a name of the invitee.

9. The device of claim 7, wherein the one or more keywords indicate that attendees of the video conference are to begin discussing a topic associated with the video conference.

10. A method, comprising determining that a non-attending invitee to a conference is not attending the conference;

based on the non-attending invitee being a required attendee for the conference, recording at least part of the conference based on the determining that the non-attending invitee is not attending the conference; and based on the non-attending invitee being an optional attendee for the conference, not recording at least part of the conference.

11. The method of claim 10, comprising:

determining that the non-attending invitee to the conference has requested that a particular segment of the conference be recorded; and based on determining that the conference has reached the particular segment, one or more of: recording the particular segment of the conference but not all of the conference, prompting the attendee of the conference to record at least the particular segment of the conference.

12. The method of claim 11, comprising:

determining that the conference has reached the particular segment based on speech of one or more attendees of the conference; and based on determining that the conference has reached the particular segment based on the speech of one or more attendees of the conference, one or more of: recording the particular segment of the conference but not all of the conference, prompting the attendee of the conference to record at least the particular segment of the conference.

13. The method of claim 12, comprising:

maintaining a buffer of content for a most-recent threshold amount of the conference; and based on determining that the conference has reached the particular segment based on the speech of one or more attendees of the conference, one or more of: recording the particular segment of the conference to include at least part of the buffered content, prompting the attendee of the conference to record the particular segment of the conference including at least part of the buffered content.

14. At least one computer readable storage medium (CRSM) that is not a transitory signal, the at least one computer readable storage medium comprising instructions executable by at least one processor to:

determine that at least part of a conference is to be recorded for a non-attending invitee of the conference and determine that the non-attending invitee has requested that a particular segment of the conference be recorded; and responsive to the determination that at least part of the conference is to be recorded for the non-attending invitee and based on the determination that the conference has reached the particular segment, one or more of: record the particular segment of the conference, prompt an attendee of the conference to record the particular segment of the conference;

wherein the instructions are executable to:

determine that the conference has reached the particular segment based on data in an electronic agenda for the conference and based on execution of speech recognition software.

15. The at least one CRSM of claim 14, wherein the speech recognition software comprises natural language processing software.

16. The at least one CRSM of claim 14, wherein the instructions are executable to:

subsequent to the conference, email, to the non-attending invitee at an email address of the non-attending invitee, a file for the recording.

17. The at least one device of claim 1, wherein instructions are executable to:

subsequent to the video conference, store a file for the recording in the invitee's personal cloud storage.

18. The at least one device of claim 1, wherein the instructions are executable to:

subsequent to the video conference, email, to the invitee at an email address of the invitee, a file for the recording.

19. The method of claim 10, comprising:

subsequent to the conference, storing a file for the recording in the non-attending invitee's personal cloud storage.

20. The method of claim 10, comprising:

subsequent to the conference, emailing, to the non-attending invitee at an email address of the non-attending invitee, a file for the recording.

* * * * *